US012586598B2

(12) United States Patent
Kapshii et al.

(10) Patent No.: US 12,586,598 B2
(45) Date of Patent: Mar. 24, 2026

(54) AUDIO DISTORTION REMOVAL BASED ON A SET OF REFERENCE AUDIO SAMPLES

(71) Applicant: Cypress Semiconductor Corporation, San Jose, CA (US)

(72) Inventors: Oleg Kapshii, Lviv (UA); Igor Kravets, Lviv (UA); Andrii Tsemko, Melitopol (UA); Ashutosh Pandey, Irvine, CA (US)

(73) Assignee: Infineon Technologies Americas Corp., El Segundo, CA (US)

( * ) Notice: Subject to any disclaimer, the term of this patent is extended or adjusted under 35 U.S.C. 154(b) by 361 days.

(21) Appl. No.: 18/329,401

(22) Filed: Jun. 5, 2023

(65) Prior Publication Data

US 2024/0404544 A1 Dec. 5, 2024

(51) Int. Cl.
| | |
|---|---|
| *G10L 21/0264* | (2013.01) |
| *G10L 15/08* | (2006.01) |
| *G10L 15/18* | (2013.01) |
| *G10L 15/22* | (2006.01) |
| *G10L 21/0208* | (2013.01) |
| *G10L 25/06* | (2013.01) |
| *G10L 25/60* | (2013.01) |

(52) U.S. Cl.
CPC ...... *G10L 21/0264* (2013.01); *G10L 15/1822* (2013.01); *G10L 15/22* (2013.01); *G10L 25/06* (2013.01); *G10L 25/60* (2013.01); *G10L 2015/088* (2013.01); *G10L 2021/02082* (2013.01)

(58) Field of Classification Search
CPC . G10L 21/0264; G10L 15/1822; G10L 15/22; G10L 25/06; G10L 25/60; G10L 2015/088; G10L 2021/02082; G10L 21/0208; G10L 15/00; G10L 21/028; G10L 15/30; G10L 25/51; G10L 25/30; G06F 3/165; H04R 3/00
See application file for complete search history.

(56) References Cited

U.S. PATENT DOCUMENTS

| | | | | |
|---|---|---|---|---|
| 8,355,914 | B2 * | 1/2013 | Joh | G06F 40/232 |
| | | | | 400/489 |
| 9,412,356 | B1 * | 8/2016 | Baker | G10K 11/17855 |
| 10,147,442 | B1 * | 12/2018 | Panchapagesan | G10L 15/063 |
| 10,529,358 | B2 * | 1/2020 | Jackson | G10K 11/17821 |
| 10,573,296 | B1 * | 2/2020 | Arel | G10L 15/063 |
| 10,602,268 | B1 * | 3/2020 | Soto | H04R 3/005 |

(Continued)

FOREIGN PATENT DOCUMENTS

| | | | | |
|---|---|---|---|---|
| AU | 2011258531 A1 * | 10/2012 | | G10L 15/30 |
| AU | 2021340886 A1 * | 3/2023 | | G16B 20/20 |

(Continued)

*Primary Examiner* — Mohammad K Islam

(57) ABSTRACT

A method includes receiving, by a processing device, an audio sample of a distorted voice. The method further includes extracting a first set of characteristics from the audio sample. The method further includes selecting a second set of characteristics. The second set of characteristics is associated with one of a set of reference audio samples. The method further includes generating an undistorted audio sample. The undistorted audio sample is based on the distorted audio sample, the first set of characteristics, and the second set of characteristics.

20 Claims, 8 Drawing Sheets

(56)　　　　　References Cited

U.S. PATENT DOCUMENTS

| | | | | |
|---|---|---|---|---|
| 11,210,461 | B2 * | 12/2021 | Thomson | G10L 15/22 |
| 11,218,796 | B2 * | 1/2022 | Klimanis | G10L 25/84 |
| 11,741,934 | B1 * | 8/2023 | Zhang | G10L 21/0208 381/71.11 |
| 2014/0079261 | A1 * | 3/2014 | Short | H04R 25/50 381/317 |
| 2014/0301569 | A1 * | 10/2014 | Every | H04R 3/04 381/103 |
| 2014/0341388 | A1 * | 11/2014 | Goldstein | G10K 11/17827 381/71.11 |
| 2015/0179184 | A1 * | 6/2015 | Cudak | G10L 21/0208 704/233 |
| 2015/0264499 | A1 * | 9/2015 | Valeri | H04S 7/302 381/58 |
| 2016/0125892 | A1 * | 5/2016 | Bowen | G10L 15/20 704/226 |
| 2016/0196108 | A1 * | 7/2016 | Selig | H03G 5/165 700/94 |
| 2016/0275936 | A1 * | 9/2016 | Thorn | G10L 15/063 |
| 2016/0360327 | A1 * | 12/2016 | Ungstrup | H04R 25/554 |
| 2017/0148466 | A1 * | 5/2017 | Jackson | G10L 15/20 |
| 2017/0213550 | A1 * | 7/2017 | Ali | G10L 15/20 |
| 2017/0374478 | A1 * | 12/2017 | Jones | G10L 21/0364 |
| 2018/0233165 | A1 * | 8/2018 | Atkinson | G06F 3/165 |
| 2018/0315413 | A1 * | 11/2018 | Lee | B60L 1/00 |
| 2018/0350383 | A1 * | 12/2018 | Moghimi | G10L 21/0364 |
| 2019/0147853 | A1 * | 5/2019 | Gunasekara | G06N 3/0442 704/243 |
| 2019/0206417 | A1 * | 7/2019 | Woodruff | G10L 21/028 |
| 2019/0208317 | A1 * | 7/2019 | Woodruff | G10L 21/0272 |
| 2019/0259381 | A1 * | 8/2019 | Ebenezer | H04R 3/005 |
| 2019/0339926 | A1 * | 11/2019 | Wahlberg | G10L 25/51 |
| 2020/0022007 | A1 * | 1/2020 | Ouyang | G10L 15/26 |
| 2020/0296510 | A1 * | 9/2020 | Li | H04R 1/1083 |
| 2020/0335084 | A1 * | 10/2020 | Wang | G10L 21/0364 |
| 2021/0035561 | A1 * | 2/2021 | D'Amato | A61N 1/3756 |
| 2022/0084539 | A1 * | 3/2022 | Kagoshima | G10L 25/03 |
| 2022/0246161 | A1 * | 8/2022 | Verbeke | G10L 21/034 |
| 2022/0343080 | A1 * | 10/2022 | Cohen | G06F 40/30 |
| 2022/0392435 | A1 * | 12/2022 | Saadatpanah | G06F 16/686 |
| 2024/0196145 | A1 * | 6/2024 | Faubel | H04R 1/08 |
| 2024/0242705 | A1 * | 7/2024 | Wang | G10L 13/047 |
| 2024/0296859 | A1 * | 9/2024 | Mohammadi | G10L 15/063 |
| 2025/0182739 | A1 * | 6/2025 | Nguyen Cong | G10L 13/08 |

FOREIGN PATENT DOCUMENTS

| | | | | |
|---|---|---|---|---|
| CN | 106782504 A | * | 5/2017 | G10L 21/0208 |
| CN | 112786006 A | * | 5/2021 | G10L 13/04 |
| CN | 112786006 B | * | 5/2024 | G10L 13/04 |
| DE | 102013216427 A1 | * | 3/2015 | G10L 15/30 |
| JP | H0827638 B2 | * | 3/1996 | |
| KR | 20170106312 A | * | 9/2017 | G10L 21/0364 |
| WO | WO-2016117793 A1 | * | 7/2016 | G10L 21/0364 |
| WO | WO-2020068056 A1 | * | 4/2020 | G10L 15/16 |
| WO | WO-2022151930 A1 | * | 7/2022 | G10L 13/10 |
| WO | WO-2022151931 A1 | * | 7/2022 | G10L 13/04 |

* cited by examiner

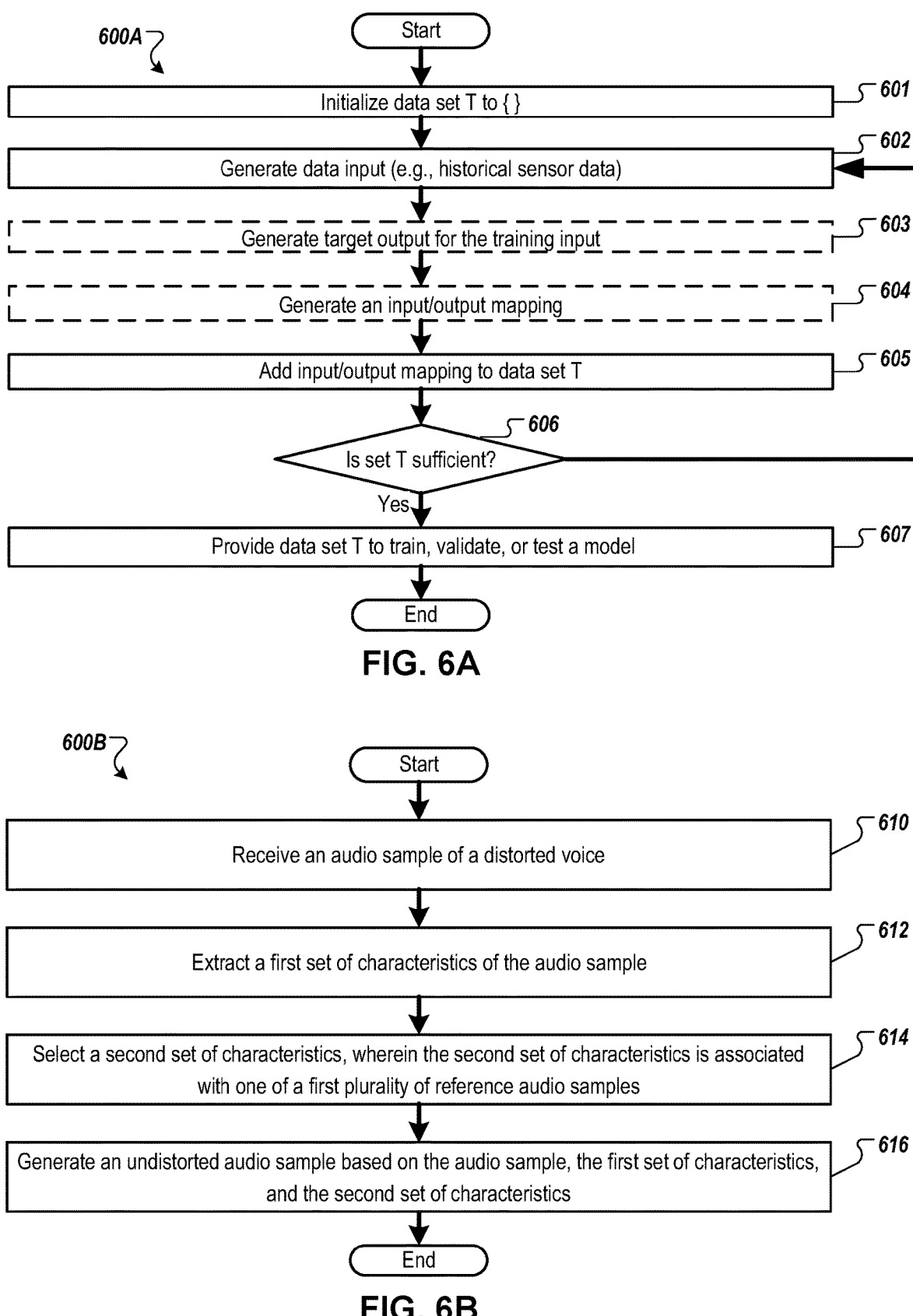

600A

Start

Initialize data set T to { } ⟋ 601

Generate data input (e.g., historical sensor data) ⟋ 602

Generate target output for the training input ⟋ 603

Generate an input/output mapping ⟋ 604

Add input/output mapping to data set T ⟋ 605

⟋ 606
Is set T sufficient?

Yes

Provide data set T to train, validate, or test a model ⟋ 607

End

Start

Receive an audio sample of a distorted voice ⟋ 610

Extract a first set of characteristics of the audio sample ⟋ 612

Select a second set of characteristics, wherein the second set of characteristics is associated with one of a first plurality of reference audio samples ⟋ 614

Generate an undistorted audio sample based on the audio sample, the first set of characteristics, and the second set of characteristics ⟋ 616

End

FIG. 6B

AUDIO DISTORTION REMOVAL BASED ON A SET OF REFERENCE AUDIO SAMPLES

TECHNICAL FIELD

The instant specification relates to methods and systems for removing distortion effects from audio samples. More particularly, the instant specification relates to methods and systems for removing distortion effects from audio samples based on a set of reference audio samples.

BACKGROUND

Modern audio applications include efficient, fast, and accurate parsing of speech by processing systems. Audio samples, such as speech, may be received by a microphone. Audio samples as received by a processing system may be distorted. For example, reverberations due to the environment in which speech was recorded may distort the audio sample, complicating processing, parsing, wake word detection, speech recognition, and other speech processing operations. Speech parsing may be improved by removing distortion effects from audio samples. Methods to remove distortion effects include modulation transfer function (MTF)-based methods. Methods to remove distortion effects include linear prediction inverse modulation transfer function dereverberation techniques.

BRIEF DESCRIPTION OF THE DRAWINGS

The present disclosure is illustrated by way of example, and not by way of limitation in the figures of the accompanying drawings.

FIG. 6A is a flow diagram of a method for generating a data set for a machine learning model, according to some embodiments.

FIG. 6B is a flow diagram of a method for removing distortion from an audio sample, according to some embodiments.

DETAILED DESCRIPTION

Figure 1:
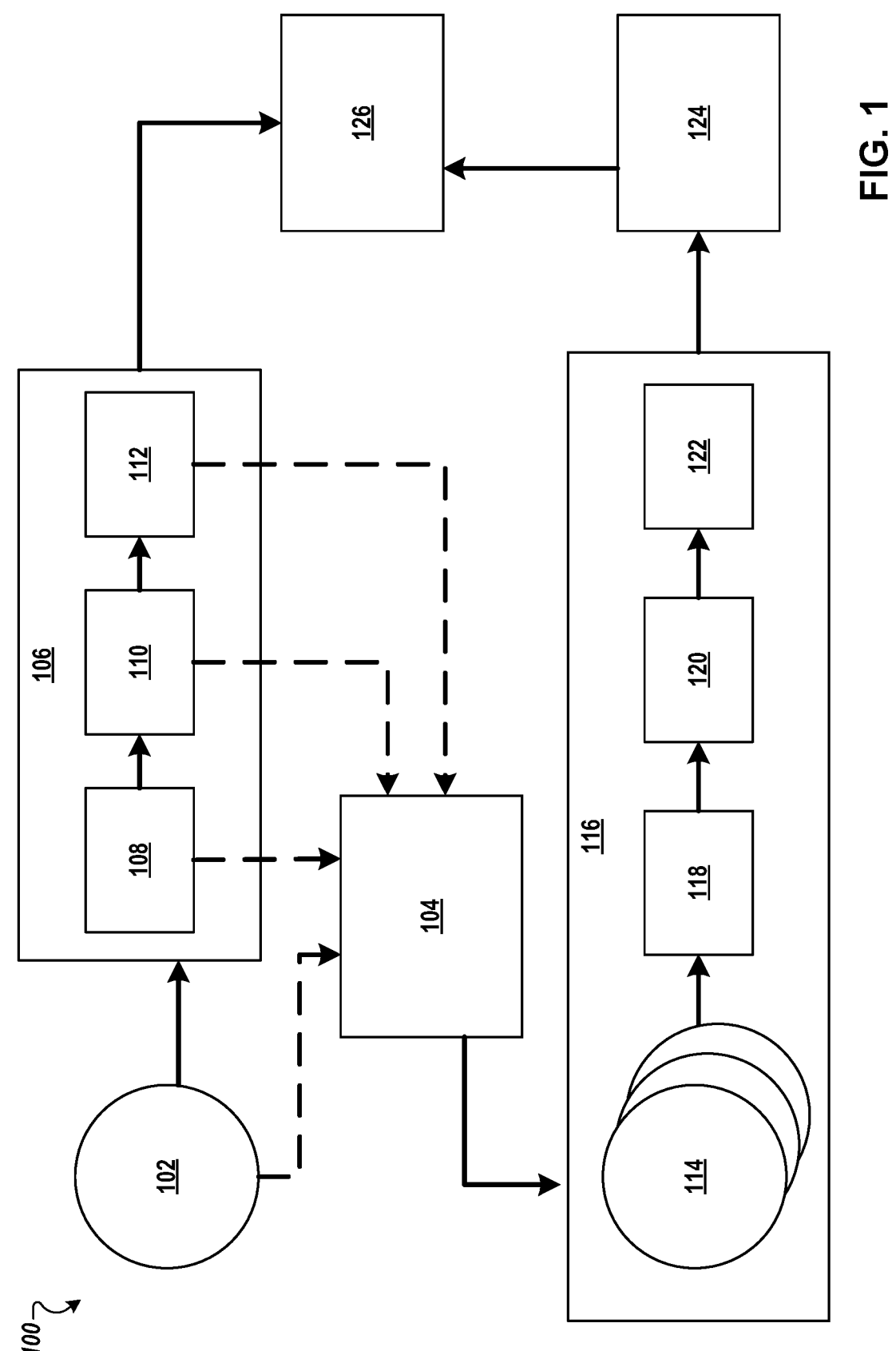
FIG. 1 is a diagram depicting data flow for MTF operations utilizing a selected reference sample, according to some embodiments.

Computer recognition and interpretation of speech are of increasing importance. As smart devices, Internet of Things devices, wearables, etc., become more ubiquitous, increasing performance of speech recognition is expected. Speech recognition and interpretation operations may include wake word detection, automated speech recognition, etc. Distortions may be introduced to a voice. For example, ambient noise may obscure a voice, the environment around a speaker may introduce reverberations into a voice received by a microphone, etc.

Efforts may be taken to remove distortion from an audio sample based on speech before recognition and interpretation operations are performed. This may improve speech interpretation operations performed by a device. Several methods may be utilized in removing distortion effects from audio samples. In some systems, a modulation transfer function (MTF) distortion removal procedure may be performed. An MTF distortion removal includes adjusting characteristics of the distorted audio sample based on a reference (e.g., etalon) voice.

In some systems, a distortion modeling operation may be performed. In a distortion modeling system, a level of distortion in the audio sample may be determined from the sample. A distortion modeling system may include providing the audio sample to a physics-based model, an empirical model, or the like. The distortion modeling operations may be directed at determining, from the audio sample, a mechanism of distortion in the audio. The distortion modeling operations may be directed at reversing the distorting operations to generate an undistorted audio sample.

In some systems, an iterative distortion removal procedure may be performed. In an iterative distortion removal procedure, a distorted audio sample may be iteratively filtered. The distorted audio sample may be separated into a number of frames. Filtering operations may be updated frame by frame.

In some systems, a machine learning distortion removal procedure may be performed. In a machine learning distortion removal procedure, a distorted audio sample may be provided to a trained machine learning model. The trained machine learning model may be configured to match characteristics of an undistorted audio sample based on the input distorted sample.

Conventional solutions have shortcomings. Distortion modeling operations involve generation, calibration, verification, etc., of an audio distortion model. Assumptions of the model may not be applicable depending on environment. Assumptions of the model may include characteristics of the voice, which may not hold for all audio samples. Assumptions of the model may include characteristics of the environment of the speaker, which may not hold for all audio samples. Performance of the distortion model may vary depending on characteristics of the audio sample. Distortion modeling may be computationally expensive. The modeling operations may consume significant computing resources, significant power, significant time, etc.

Iterative distortion removal procedures may suffer from a lack of adaptability of the filtering operations. Iterative distortion removal procedures may suffer in distortion removal end pointing. Iterative distortion removal procedures may suffer in performance frame to frame of an audio sample. Machine learning distortion removal procedures may be of inconsistent quality between audio samples. For example, audio samples with characteristics that were insufficiently trained for may not be processed as effectively.

Traditional MTF distortion removal has shortcomings. MTF distortion removal alters characteristics of a distorted audio sample based on characteristics of a reference audio sample. Characteristics of a distorted sample may be dissimilar from characteristics of the reference sample. An audio sample similar to the reference sample may have distortion removed more accurately than an audio sample dissimilar to the reference sample.

Methods and systems of the present disclosure may address one or more shortcomings of conventional systems. An audio sample based on a distorted voice may be provided to a distortion removal module. The distortion removal module may include a trained machine learning model. The distortion removal module may determine one or more characteristics of the audio sample. The distortion removal module may determine a reference sample from a library of reference samples to be used in removing distortion from the distorted audio sample. Characteristics of the selected reference sample may be provided to an MTF module. The distorted audio sample may be provided to the MTF module. MTF distortion removal operations may be performed based on the distorted audio sample and the selected reference sample.

The trained machine learning model may determine the reference sample to be used in distortion removal. The trained machine learning model may further determine one or more characteristics of the distortion removal procedure. The trained machine learning model may determine one or more characteristics of an auto regression analysis of the distortion removal procedure. The trained machine learning model may determine one or more characteristics of smoothing operations of the distortion removal procedure.

Methods and systems of the present disclosure may provide technical advantages over conventional solutions. Distortion modeling, iterative filtering, and machine learning distortion removal methods tend to provide similar performance to conventional MTF distortion removal. Additionally these techniques may suffer in terms of computing power, power consumption, inconsistent results for audio sample with varied characteristics, etc. Receiving a distorted audio sample, determining a relevant reference sample, and performing MTF analysis on the distorted audio sample based on the reference sample may improve performance of distortion removal techniques over audio samples with a wide range of characteristics compared to traditional MTF analysis.

In one aspect of the present disclosure, a method includes receiving, by a processing device, an audio sample of a distorted voice. The method further includes extracting a first set of characteristics from the audio sample. The method further includes selecting a second set of characteristics. The second set of characteristics is associated with one of a set of reference audio samples. The method further includes generating an undistorted audio sample. The undistorted audio sample is based on the distorted audio sample, the first set of characteristics, and the second set of characteristics.

In another aspect of the present disclosure, a system includes memory and a processing device, coupled to the memory. The processing device is configured to receive an audio sample of a distorted voice. The processing device is further configured to extract a first set of characteristics of the audio sample. The processing device is further configured to select a second set of characteristics. The second set of characteristics is associated with one of a set of reference audio samples. The processing device is further configured to generate an undistorted audio sample. The undistorted audio sample is based on the audio sample, the first set of characteristics, and the second set of characteristics.

In another aspect of the present disclosure, a non-transitory machine-readable storage medium stores instruction. The instructions, when executed, cause a processing device to perform operations. The operations include receiving an audio sample of a distorted voice. The operations further include extracting a first set of characteristics of the audio sample. The operations further include selecting a second set of characteristics. The second set of characteristics is associated with one of a set of reference audio samples. The operations further include generating an undistorted audio sample. The undistorted audio sample is generated based on the distorted audio sample, the first set of characteristics, and the second set of characteristics.

FIG. 1 is a diagram depicting data flow 100 for MTF operations utilizing a selected reference sample, according to some embodiments. In MTF operations for removing distortion from audio, a set of characteristics of a reference audio sample are extracted. The characteristics are utilizing in removing distortion effects from a distorted audio sample. Distortion of an audio sample may be considered to be the result of applying a distortion function to undistorted audio. MTF operations may be considered to approximately apply the inverse of the distortion function, by utilizing differences between characteristics of an undistorted audio sample and a distorted audio sample.

An audio sample 102 is received. The audio sample 102 may be received by processing logic, a processing device, etc. Audio sample 102 may include some distortion. Audio sample 102 may include reverberation or other types of audio distortion. Audio sample 102 may be provided via a microphone. Audio sample 102 may have been pre-processed. Audio sample 102 may have been converted from an analog to digital format, may have been filtered, may have been adjusted in amplitude and/or frequency, or had other pre-processing operations performed. Audio sample 102 may be audio of a voice.

Audio sample 102 may be provided to reference audio selection module 104. Audio sample 102 may, instead or additionally, be provided to reference audio selection module 104 at a different step of audio processing, indicated by the dashed arrow. Reference audio selection module 104 may determine a reference audio sample for use in removing distortion from audio sample 102. Reference audio selection module 104 may be or include a heuristic or rule-based model. Reference audio selection module 104 may be configured to recommend a reference audio sample for MTF operations based on one or more characteristics of audio sample 102. Reference audio selection module 104 may recommend a reference audio sample for MTF operations based on one or more frequency components of audio sample 102. Reference audio selection module 104 may be configured to recommend a reference audio sample for MTF operations based on a pitch of a voice represented by audio sample 102. Reference audio selection module 104 may be configured to recommend a reference audio sample based on a speed of speech associated with audio sample 102. Reference audio selection module 104 may be configured to recommend a reference audio sample based on another characteristic of audio sample 102, or a combination of characteristics of audio sample 102. Reference audio selection module 104 may be or include a trained machine learning model. Reference audio selection module 104 may be trained to receive an audio sample and select, from a library of reference audio samples, an appropriate reference audio sample for distortion removal operations associated with the received audio sample.

Audio sample 102 is further provided to audio sample analysis block 106. Audio sample analysis block 106 may perform several operations. Audio sample analysis block 106 may determine one or more characteristics of audio sample 102. The determined characteristics may be utilized in distortion removal procedures.

Audio sample analysis block 106 may include transform block 108. Transform block 108 may transform audio sample 102 from one domain to another domain. Transform block 108 may transform audio sample 102 from a time domain to a frequency domain signal. Transform block 108 may perform a Fourier transform on audio sample 102. Transform block 108 may perform a short-time Fourier transform on audio sample 102. Transformed audio sample data may be provided to reference audio selection module 104 in some embodiments. Characteristics of the audio sample, such as frequency component characteristics, changes in frequency characteristics over time, etc., may be determined by transform block 108.

Transformed audio sample data may be provided to autocorrelation module 110. Autocorrelation module 110 may perform autocorrelation analysis on the transformed audio sample. Autocorrelation module 110 may determine one or more characteristics of the audio sample. Autocorrelation module 110 may determine one or more autocorrelation coefficients of the audio sample. Output of autocorrelation module 110 may be provided to reference audio selection module 104 in some embodiments.

Data indicative of the audio sample may be provided to filter coefficient extraction module 112. Filter coefficient extraction module 112 may determine one or more filtering parameters for distortion removal operations. Filtering parameters may include one or more envelopes in frequency space, adjustment of repeating parameters via autocorrelation coefficients, etc.

Operations of reference audio selection module 104 include selection of reference audio sample 114. A reference audio sample 114 may be selected from a library of reference audio samples. The reference audio sample 114 may be a voice sample, e.g., audio indicative of a voice. The reference audio sample 114 may be associated with a voice with target characteristics. The reference audio sample 114 may be of a voice with one or more characteristics similar to audio sample 102. The reference audio sample 114 may be selected from a library of audio samples in a later stage of reference audio processing. Reference audio selection module 104 may provide data at one or more blocks of reference audio analysis block 116.

Reference audio samples may be analyzed by reference audio analysis block 116. A library of reference audio samples may be analyzed to generate a library of analyzed reference audio samples. A library of reference audio samples may be analyzed to generate a library of reference audio characteristics. A library of reference audio samples may be analyzed to generate a library of filtering coefficients, filtering characteristics, or the like. Audio selection module 104 may be configured to select a reference audio sample, a set of reference audio characteristics, a set of reference audio filtering coefficients, or the like. In some embodiments, one or more operations of reference audio analysis block 116 may be performed offline. In some embodiments, one or more operations of reference audio analysis block 116 may be performed before an audio sample (e.g., audio sample 102) is received for analysis. Results of performing operations of reference audio analysis block 116 may include producing output. Output of reference audio analysis block 116 may include parameters for use in further analysis, such as MTF parameters and/or filtering parameters. Output of reference audio analysis block 116 may be pre-calculated. Analysis parameters provided by reference audio analysis block 116 may be calculated and stored in memory, for use upon receiving an audio sample for distortion removal operations. Parameters for use in removing distortion from an audio sample may be selected from a library of precalculated sets of analysis parameters. In some embodiments, operations of audio sample analysis block 106 may be performed live. Operations of audio sample analysis block 106 may be performed upon receiving an audio sample. Operations of audio sample analysis block 106 may be performed in real time. Operations of audio sample analysis block 106 may be initiated while the audio sample is being generated. Performance of operations of audio sample analysis block 106 may overlap temporally with a speaker providing a voice sample for distortion removal operations. In some embodiments, one or more of the operations of audio selection module 104 may be performed live. In some embodiments, one or more of the operations of audio selection module 104 are performed upon receipt of an audio sample.

Reference audio analysis block 116 may include reference transform block 118. Reference transform block 118 may be utilized in transforming a domain of each of a library of reference audio samples. Reference transform block 118 may transfer a library of reference audio samples to the frequency domain. Reference transform block 118 may perform a short time Fourier transform. Reference transform block 118 may perform one or more operations similarly to transform block 108.

Reference audio analysis block 116 may include reference autocorrelation module 120. Reference autocorrelation module 120 may perform autocorrelation analysis on a library of reference audio samples. Reference autocorrelation module 120 may generate a set of autocorrelation coefficients for each of a library of reference audio samples. Reference autocorrelation module 120 may perform one or more operations similarly to autocorrelation module 110.

Reference audio analysis block 116 may include reference filter coefficient extraction module 122. Reference filter coefficient extraction module 122 may determine one or more filtering parameters for distortion removal operations. Reference filter coefficient extraction module 122 may determine one or more filtering parameters based on reference audio samples to be used in removing distortion from live audio samples. Reference filter coefficient extraction module 122 may operate similarly to filter coefficient extraction module 112.

Output of reference audio analysis block 116 may be provided to reference audio storage 124. Reference audio storage 124 may comprise one or more memory devices. Reference audio storage 124 may comprise a memory, a drive, a database system, or another type of component or device capable of storing data. In some embodiments output of reference audio analysis block 116 may be provided to MTF module 126. In some embodiments, output of reference audio analysis block 116 may be retrieved from reference audio storage 124 to be provided to MTF module 126.

Data indicative of one or more reference audio samples is provided to MTF module 126. Data indicative of the audio sample 102 is provided to MTF module 126. MTF module performs modulation transfer function operations for removal of distortion from audio sample 102. MTF module 126 may perform linear prediction modulation transfer function operations. MTF module 126 may perform linear prediction inverse modulation transfer function dereverberation operations.

An example conception of use of a linear prediction inverse modulation transfer function operation to remove audio distortion follows. A distorted audio sample may be considered to be the result of applying a distorting function to an undistorted audio sample. MTF module 126 may be configured to approximately reverse application of the distorting function to recover the undistorted audio. The distorting function may be approximately represented as multiplication of an undistorted sample by some distortion factor, e.g., $$Y = Y' \times M,$$

where Y is the distorted audio sample, Y' is the undistorted sample, and the distorting function is modeled as multiplication by M. The distorting function may be frequency dependent (e.g., a frequency filter). The distorting function may be time dependent (e.g., act differently on different segments of a short time Fourier transform of an audio sample).

M may be related to characteristics of recording equipment, recording environment, etc. M may be extracted from characteristics of the distorted audio sample. M may be determined by one or more differences between a distorted audio sample and an undistorted reference sample. MTF module 126 may determine a distortion inversion function, such that $$Y' = Y \times M^{-1}.$$

M may be modeled as a quotient of characteristics or coefficients related to a distorted audio sample and characteristics or coefficients related to a reference sample. In some embodiments, characteristics of a clean sample may be considered to return clean audio when applied to an audio sample. For example, $$Y \times M_C = Y,$$

where $M_c$ represents one or more characteristics of a clean (reference) audio sample. An undistorted audio sample may be approximately recovered by applying a function to the distorted audio, such as $$Y' = Y \times \frac{M_C}{M_D},$$

where $M_D$ represents one or more characteristics of the distorted audio sample. In some embodiments, details of operations of leaner prediction inverse modulation transfer function distortion removal techniques may differ from those presented here, and be within the scope of this disclosure. These operations are presented to aid in a conceptual understanding of distortion removal techniques such as those performed by MTF module 126.

Figure 2:
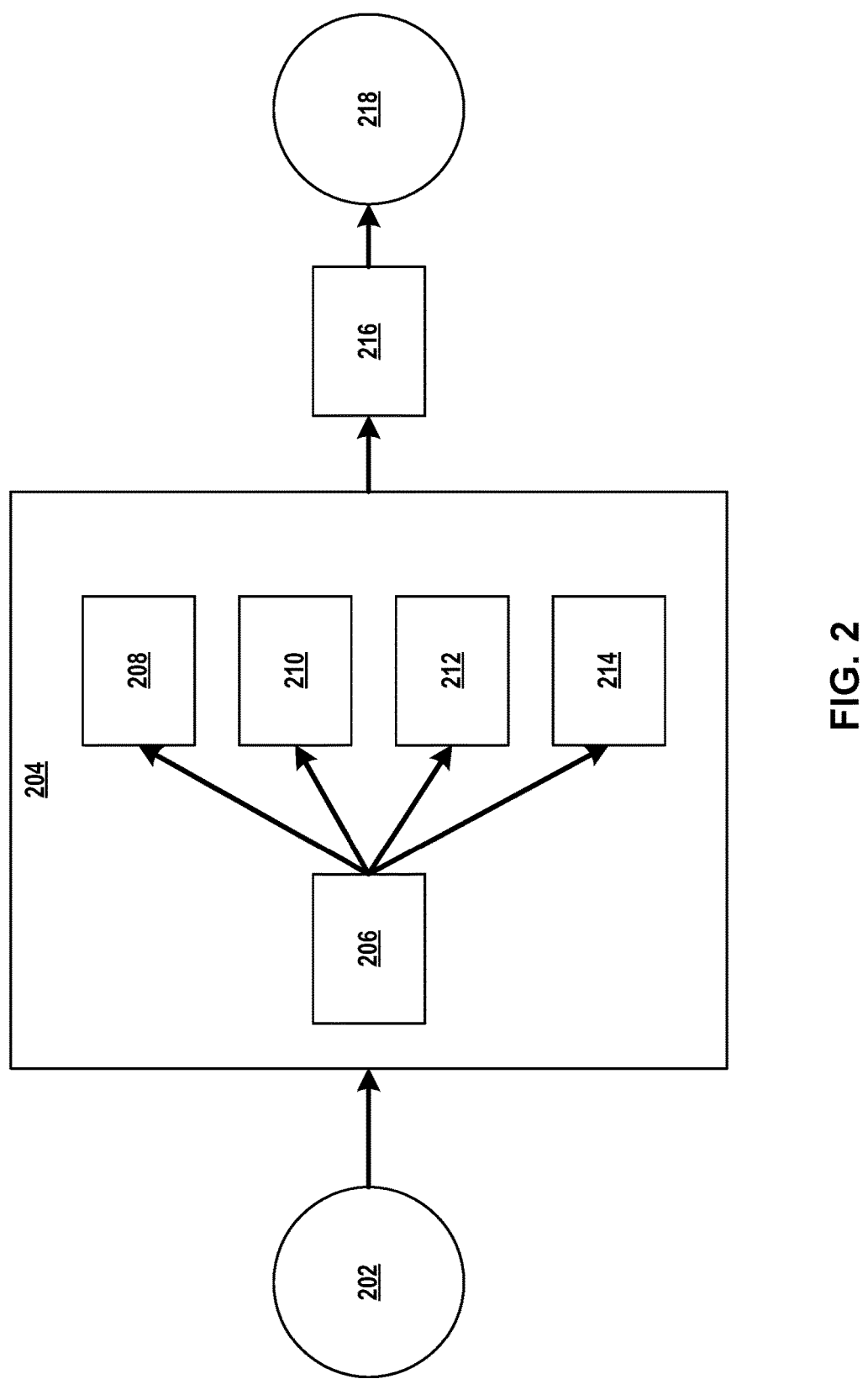
FIG. 2 is a diagram depicting data flow for use of a trained machine learning model for reference selection and distortion removal, according to some embodiments.

FIG. 2 is a diagram depicting data flow 200 for use of a trained machine learning model for reference selection and distortion removal, according to some embodiments. Audio sample 202 is provided to trained machine learning model 204. Trained machine learning model 204 may include multiple machine learning models. Trained machine learning model 204 may be or include a neural network. Trained machine learning model 204 may be an ensemble model, including multiple machine learning models.

Trained machine learning model 204 may include convolutional layers 206. Convolutional layers 206 may include operations of audio sample encoding, e.g., vectorizing for input to the machine learning architecture. Convolutional layers 206 may include extracting features from audio sample 202. Convolutional layers 206 may extract target features from audio sample 202. Convolutional layers 206 may determine features based on training operations of the trained machine learning model.

Trained machine learning model 204 may include classification modules 208-214. Each of the classification modules 208-214 may be configured to provide output directed for use in a target set of operations. Each of the classification modules 208-214 may be configured to provide output for use in one or more operations of an audio distortion removal procedure. Classification modules include reference selection 208. Reference selection 208 may be configured to select a reference audio sample from a library of reference audio samples for use in removing distortion from audio sample 202. Reference selection 208 may select the reference audio sample based on training of the trained machine learning model. Training and use of a machine learning model are described in more detail in connection with FIGS. 4 and 6A-C. Reference selection 208 may select the reference audio sample based on one or more characteristics of the reference audio sample. Reference selection 208 may select the reference audio sample based on one or more similarities between the reference audio sample and audio sample 202. Reference selection 208 may select a filter, filtering coefficients, or the like associated with a reference audio sample.

Classification modules may perform additional functions. Trained machine learning model 204 may include auto regression parameter module 210. Auto regression parameter module 210 may provide as output one or more parameters for performance of auto regression operations on audio sample 202. Auto regression parameter module 210 may be configured to return as output an optimized set of auto regression parameters. Auto regression parameter module 210 may provide, as output auto regression coefficients, parameters of an auto-regressive filter, etc.

Trained machine learning model 204 may include smoothing module 212. Smoothing module 212 may generate as output smoothing parameters for audio sample 202. Smoothing module 212 may generate smoothing parameters for frequency bands of audio sample 202. Smoothing module 212 may generate smoothing parameters for time windows of audio sample 202. Trained machine learning model 204 may include microphone smoothing module 214. Microphone smoothing module 214 may provide microphone-dependent smoothing parameters. Microphone smoothing module 214 may provide parameters for combining/smoothing autocorrelation/autoregression coefficients for several microphones. Output of microphone smoothing module 214 may be based on audio sample 202. Output of microphone smoothing module 214 may be based on metadata associated with audio sample 202. Output of microphone smoothing module 214 may be based on one or more indications of a microphone associated with audio sample 202.

Output of classification modules may be provided to a distortion removal module 216. Audio sample 202 may further be provided to distortion removal module 216. Distortion removal module 216 may make adjustments to audio sample 202 to remove distortion effects from audio sample 202. Distortion removal module 216 may generate as output processed audio 218.

Figure 3:
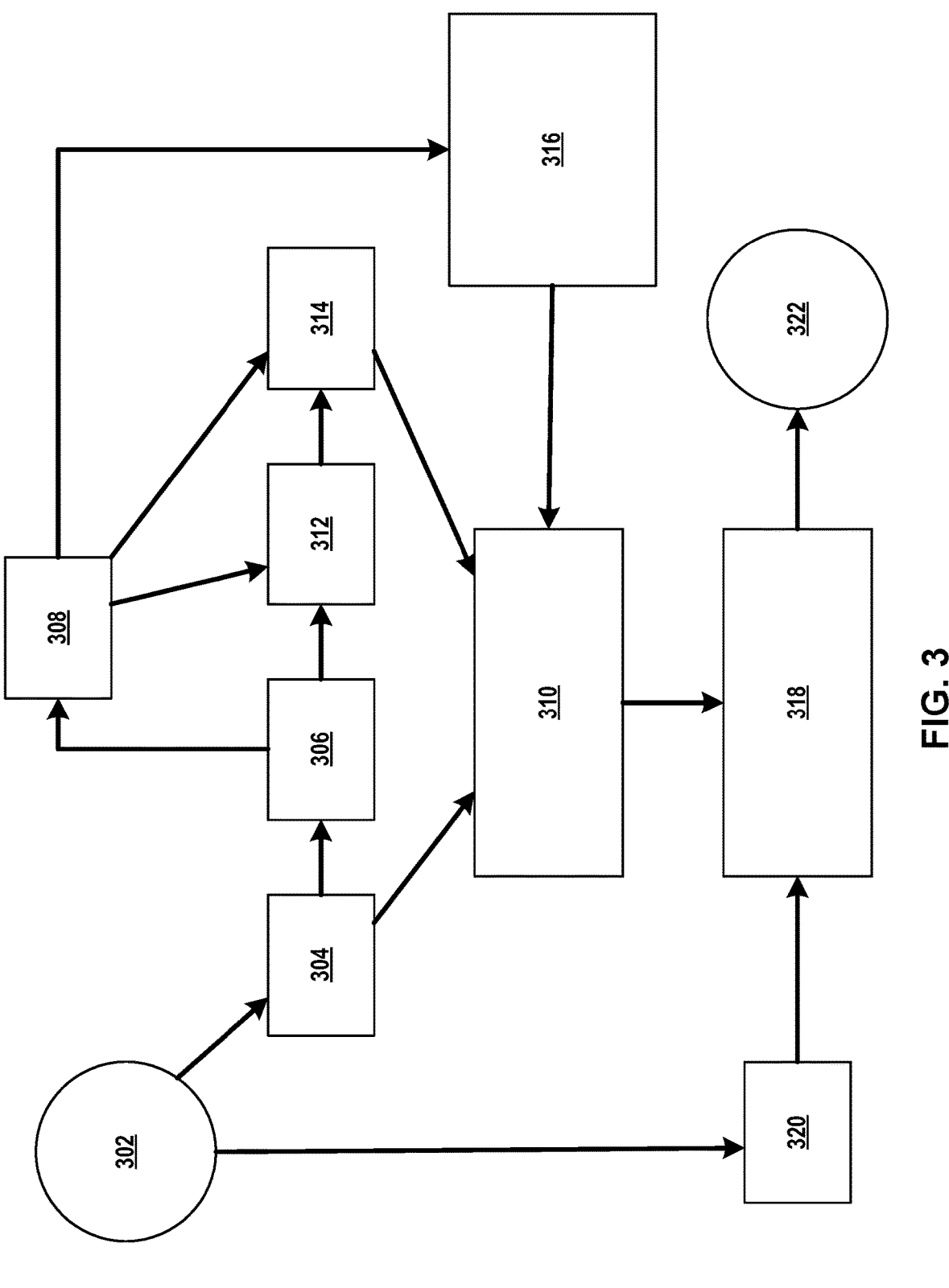
FIG. 3 depicts flow of an example audio distortion removal procedure, according to some embodiments.

FIG. 3 depicts flow 300 of an example audio distortion removal procedure, according to some embodiments. Audio sample 302 is provided for distortion removal operations. Audio sample 302 may be provided to one or more components, modules, processing devices, etc. Audio sample 302 may be provided to a frequency domain conversion module 304. Frequency domain conversion module 304 may perform a short time Fourier transform on audio sample 302.

Output of frequency domain conversion module 304 may be provided to an autocorrelation module 306. The output indicative of the audio sample 302 may be provided to autocorrelation module 306 in a number of channels. The channels may represent portions of information included in audio sample 302. The channels may be related to time segments of the short time Fourier transform operation. The channels may each be associated with a frequency band. Each frequency band may include time-dependent behavior. Each frequency band may evolve in time. Dereverberation filters may be applied to the frequency channels. Filters applied to the audio may be different for different channels. Filters applied to the audio may be different for different frequency bands. Output of frequency domain conversion module 304 may further be provided to filtering module 310. Filtering module 310 may apply one or more filtering functions to the audio sample (represented in the frequency domain) to remove distortion effects from the audio sample. Filtering module 310 may apply one or more filters to data based on audio sample 302 to remove reverberation effects. Filtering module 310 may perform linear prediction inverse modulation transfer function distortion removal operations. Filtering module 310 may perform linear prediction inverse modulation transfer function reverberation removal operations.

Output of the autocorrelation module 306 may be provided to a machine learning model 308. In some embodiments, further inputs may be provided to machine learning model 308. Further input may include output of frequency domain conversion module 304. Further input may include output of a later operation, such as output of auto regression module 312. For example, machine learning model 308 may work in an iterative manner, receiving input dependent upon earlier iteration output of the machine learning model 308. Output of the autocorrelation module may include autocorrelation coefficients. Output of the autocorrelation module may further include a representation of audio sample 302, e.g., in the frequency domain. Output of autocorrelation module 306 may further be provided to auto regression module 312. In some embodiments, machine learning model 308 may be configured to provide one or more parameters to auto regression module 312. Auto regression module 312 may extract one or more auto regression parameters from data received from autocorrelation module 306. Auto regression module 312 may perform auto regression operations in accordance with parameters received from machine learning model 308. Machine learning model 308 may provide a target number of filter coefficients to be determined by auto regression module 312. Machine learning model 308 may provide an optimal number of filter coefficients to be determined by auto regression module 312.

Output of auto regression module 312 may be provided to smoothing module 314. Smoothing module 314 may perform data smoothing operations on data based on audio sample 302. Smoothing module 314 may perform data smoothing operations on audio sample 302 expressed in the frequency domain. Smoothing module 314 may perform data smoothing operations on one or more channels associated with the audio sample 302. In some embodiments, machine learning model 308 may provide one or more parameters to smoothing module 312. These may include smoothing weights for smoothing between audio of different microphones. Smoothing operations may include smoothing autocorrelation coefficients. For example, autocorrelation coefficients may be smoothed via a moving average. Autocorrelation coefficients may be smoothed separately for each frequency band, frequency component, frequency channel, etc. Output of smoothing module 314 is further provided to filtering module 310.

Output of machine learning model 308 is further provided to reference audio storage 316. Reference audio storage 316 includes data associated with each of a library of reference audio samples for use in distortion removal. Reference audio storage 316 may include filtering coefficients associated with each of a library of reference audio samples. Output of machine learning model 308 may indicate which of the library of reference audio samples is to be used in distortion removal operations of audio sample 302. The selected filtering audio, the selected filtering coefficients, or the like may be provided to filtering module 310.

Filtering module 310 may perform operations (e.g., MTF operations) to remove distortion from audio sample 302. Operations of filtering module 310 may be similar to one or more operations described in connection with FIG. 1. For each set of autocorrelation coefficients, corresponding filter coefficients may be determined. The number of coefficients to be determined may be specified by a user. The number of coefficients to be determined may be determined by a machine learning model. Upon filtering the various channels, smoothing operations may again be performed. Smoothing operations may be limited by an acceptable change value. Filtered audio data may be provide to synthesis module 318. Synthesis module 318 may return the filtered audio data to the time domain. Synthesis module 318 may return time portions from a short time Fourier transform operation to the time domain. Synthesis module 318 may perform overlap-add processing on short time Fourier transform data. In some embodiments, synthesis module 318 may receive phase data of audio sample 302. Audio sample 302 may be provided to phase extraction module 320. Phase data of audio sample 302 may be provided by phase extraction module 320 to synthesis module 318. Synthesis module 318 may generate undistorted audio sample 322.

In some embodiments, an audio sample may be separated into a set of frames. Processing an entire audio sample concurrently may be computationally expensive. Processing an entire audio sample concurrently may introduce undesired delays. For automated speech recognition or wake-word-detection operations, initiation of a response action may target a set time delay, and processing an entire audio sample may increase response time. An audio sample may be separated into a set of frames to address one or more of these challenges. The audio sample may be broken up into a series of time windows. The time windows may be consecutive. The time windows may be somewhat overlapping. Analysis described in connection with FIG. 3 may be performed frame-by-frame. Analysis of a later frame may be influenced by analysis of an earlier frame. Selection of a reference audio sample associated with a frame of audio may be influenced by previous selections of reference audio samples. Selecting a reference audio sample for a frame may be, at least in part, based on selections of reference audio samples for previous frames. Analysis of an earlier frame may be updated responsive to analysis of a later frame. Earlier frames of an audio sample may be stored in memory. Upon assigning a reference voice to a later frame of the audio sample, a determination may be made whether to update distortion removal operations of the earlier frame, based on selection of a different reference voice for the later frame. A reference voice may be retroactively adjusted based on analysis of later frames.

Frame-by-frame processing may start from some predetermined initial filter parameters. After processing some number of frames. the input signal characteristics may be estimated and the filter parameters may be updated according to procedures discussed in connection with FIG. 3. The filtering parameters may be updated periodically during ongoing frames processing, as additional information related to distortion removal is collected.

Figure 4:
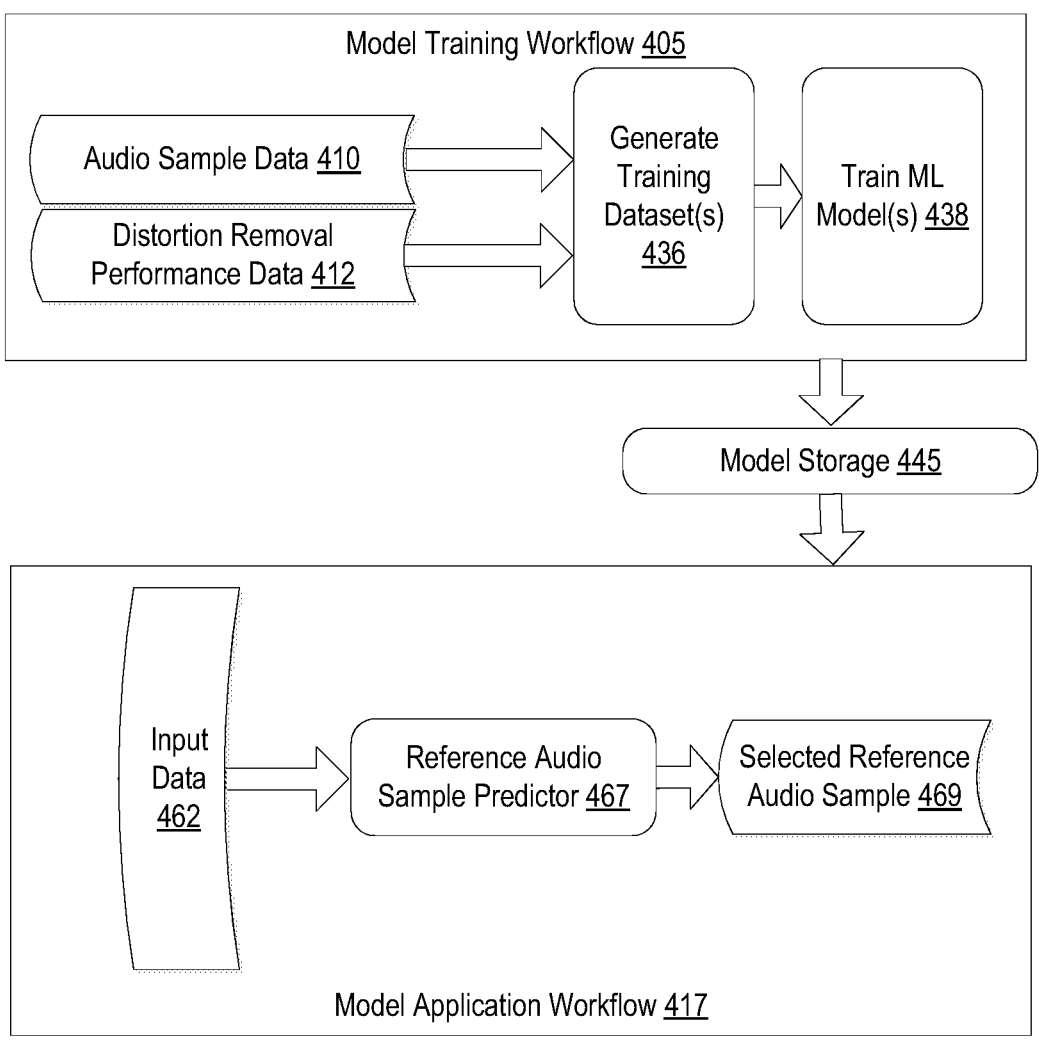
FIG. 4 illustrates a model training workflow and a model application workflow for selection of parameters for audio sample distortion removal, according to some embodiments.

FIG. 4 illustrates a model training workflow 405 and a model application workflow 417 for selection of parameters for audio sample distortion removal, in accordance with an embodiment of the present disclosure. In embodiments, the model training workflow 405 may be performed at a server which may or may not include an audio sample generation system, and the trained models are provided to an audio processing application (e.g., on a client device), which may perform the model application workflow 417. The model training workflow 405 and the model application workflow 117 may be performed by processing logic executed by a processor of a computing device. One or more of these workflows 405, 417 may be implemented, for example, by one or more machine learning modules.

The model training workflow 405 is to train one or more machine learning models (e.g., deep learning models, neural networks) to perform one or more classifying, segmenting, detection, recognition, decision, etc. tasks associated with an audio sample distortion removal procedure. The audio sample distortion removal procedure may be part of a speech identification and/or recognition workflow. The model application workflow 417 is to apply the one or more trained machine learning models to perform the classifying, segmenting, detection, recognition, determining, etc. tasks for audio sample distortion removal procedures. One or more of the machine learning models may receive and process result data and distortion removal process configuration data.

Various machine learning outputs are described herein. Particular numbers and arrangements of machine learning models are described and shown. However, it should be understood that the number and type of machine learning models that are used and the arrangement of such machine learning models can be modified to achieve the same or similar end results. Accordingly, the arrangements of machine learning models that are described and shown are merely examples and should not be construed as limiting.

In some embodiments, one or more machine learning models are trained to perform one or more of the below tasks. Each task may be performed by a separate machine learning model. Alternatively, a single machine learning model may perform each of the tasks or a subset of the tasks. Additionally, or alternatively, different machine learning models may be trained to perform different combinations of the tasks. In an example, one or a few machine learning models may be trained, where the trained ML model is a single shared neural network that has multiple shared layers and multiple higher-level distinct output layers, where each of the output layers outputs a different prediction, classification, identification, etc. The tasks that the one or more trained machine learning models may be trained to perform are as follows:

I. Determination of a reference audio sample for use in distortion removal operations—a trained machine learning model may be utilized in determining, from a library of reference audio samples, which reference audio sample to use in removing distortion from a target distorted audio sample.

II. Determination of one or more parameters to be utilized in distortion removal operations—a trained machine learning model may be utilized in determining one or more settings, parameters, characteristics, coefficients, etc., for use while removing distortion from a distorted audio sample. The parameters may include auto regression analysis parameters. The parameters may include data smoothing parameters. The parameters may include smoothing weights for various microphone input devices.

III. Clustering of potential reference audio samples into classes—a trained machine learning model may be utilized in selecting a subset of potential reference audio samples for use in a distortion removal operation. The subset may be selected based on a clustering operation, e.g., a subset of potential reference audio samples with similar performance may be utilized in distortion removal operations. A clustering machine learning model may be an unsupervised model. An unsupervised machine learning model may be trained without providing target output during training operations.

One type of machine learning model that may be used to perform some or all of the above tasks is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and nonlinearities may be addressed, at lower layers, on top of which a multi-layer perceptron is commonly appended, mapping top-layer features extracted by the convolutional layers to decisions (e.g., classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

Training of a neural network may be achieved in a supervised learning manner, which involves feeding a training dataset consisting of labeled inputs through the network, observing its outputs, defining an error (by measuring the difference between the outputs and the label values), and using techniques such as deep gradient descent and back-propagation to tune the weights of the network across all its layers and nodes such that the error is minimized. In many applications, repeating this process across the many labeled inputs in the training dataset yields a network that can produce correct output when presented with inputs that are different than the ones present in the training dataset. Training of a machine learning model may be achieved in an unsupervised model, which includes providing a training dataset with unlabeled inputs. Unsupervised models may be useful for outlier detection, anomaly classification, clustering/categorization, or the like.

For the model training workflow 405, a training dataset containing hundreds, thousands, tens of thousands, hundreds of thousands, or more set of audio sample data 410 may be used to form a training dataset. The audio sample data may include indications of distorted audio samples. For example, the audio sample data may include audio samples for training a machine learning model configured to receive audio samples, may include frequency domain conversions of audio samples for training a machine learning model configured to receive frequency domain data, may include autocorrelation parameters for training a machine learning model configured to receive autocorrelation parameters, etc.

In some embodiments, the training dataset may also include associated distortion removal performance data 412 for forming a training dataset. In some embodiments, each data point and/or associated performance data may include various labels or classifications of one or more types of useful information. Distortion removal performance data 412 may include indications of how effectively distortion effects were removed from an associated audio sample. Distortion removal performance data 412 may include data associated with a variety of input audio samples and a variety of reference audio samples (e.g., etalon voices). Distortion removal performance data 412 may indicate, from a library of reference audio samples, which reference audio sample generated the best distortion removal results for each audio sample included in audio sample data 410. Distortion removal performance data 412 may be generated by performing distortion removal operations for each of a library of audio samples, using each of a library of reference audio samples as reference in the distortion removal procedure. Distortion removal performance data 412 may be generated by applying distortion effects to clean audio samples, performing distortion removal operations, and comparing the output audio samples with distortion removed to the original clean audio samples. Distortion removal performance data 412 may be generated by determining a score associated with audio clarity, such as a perceptual evaluation of speech quality (PESQ) score.

Audio sample data 410 and distortion removal performance data 412 may be processed to generate one or multiple training datasets 436 for training of one or more machine learning models. In some embodiments, generating one or more training datasets 436 includes gathering one or more process result measurements (e.g., PESQ scores) of processed audio samples processed in systems with varying audio processing configurations. Other types of data may be utilized in training machine learning models for other functions. Data types corresponding to the intended functions may be utilized in generating other trained machine learning models, in providing more functions to a machine learning model, etc. A machine learning model may be configured to generate multiple types of data associated with distortion removal operations. A machine learning model may be configured to generate a reference audio sample selection, auto regression parameters, smoothing parameters, etc. A machine learning model configured to generate auto regression parameters may be provided with audio sample data, auto regression parameters, and performance data (e.g., distortion removal performance data such as PESQ scores) as training data. A machine learning model configured to generate smoothing parameters may be provided with audio sample data, smoothing parameter data, and performance data as training data. A machine learning model may be utilized in clustering data. A machine learning model may be utilized in clustering performance of reference audio samples. A machine learning model may be provided performance data of a set of reference audio samples when used in removing distortion from a set of audio samples. The machine learning model may further be provided audio sample data, such as autocorrelation parameters. A machine learning model for clustering operations may not be provided with target output, e.g., the machine learning model may be an unsupervised machine learning model.

To effectuate training, processing logic inputs the training dataset(s) 436 into one or more untrained machine learning models for ML model training 438. Prior to inputting a first input into a machine learning model, the machine learning model may be initialized. Processing logic trains the untrained machine learning model(s) based on the training dataset(s) to generate one or more trained machine learning models that perform various operations as set forth above.

Training may be performed by inputting one or more of the audio sample data 410 and distortion removal performance data 412 into the machine learning model one at a time. In some embodiments, the training of the machine learning model includes tuning the model to receive audio sample data 410 and output a predicted reference audio sample that will have the best performance when used in distortion removal operations for a target audio sample. The machine learning model processes the input to generate an output. An artificial neural network includes an input layer that consists of values in a data point. The next layer is called a hidden layer, and nodes at the hidden layer each receive one or more of the input values. Each node contains parameters (e.g., weights) to apply to the input values. Each node therefore essentially inputs the input values into a multivariate function (e.g., a nonlinear mathematical transformation) to produce an output value. A next layer may be another hidden layer or an output layer. In either case, the nodes at the next layer receive the output values from the nodes at the previous layer, and each node applies weights to those values and then generates its own output value. This may be performed at each layer. A final layer is the output layer, where there is one node for each class, prediction, and/or output that the machine learning model can produce.

Accordingly, the output may include one or more predictions or inferences. For example, an output prediction or inference may include a determined optimal reference audio sample of a library of reference audio samples.

Processing logic may compare the determined output against a target output and determine whether a threshold criterion is met (e.g., whether the machine learning model predicted the correct reference audio sample). Processing logic determines an error (i.e., a classification error) based on the differences between the determined output and the target output. Processing logic adjusts weights of one or more nodes in the machine learning model based on the error. An error term or delta may be determined for each node in the machine learning model. An error term may be determined for each node in an artificial neural network.

Based on this error, the machine learning model adjusts one or more of its parameters for one or more of its nodes (the weights for one or more inputs of a node). Parameters may be updated in a back propagation manner, such that nodes at a highest layer are updated first, followed by nodes at a next layer, and so on. A machine learning model may contain multiple layers of "neurons", where each layer receives input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the machine learning model, such as an artificial neural network.

Once the model parameters have been optimized, model validation may be performed to determine whether the model has improved and to determine a current accuracy of the machine learning model. After one or more rounds of training, processing logic may determine whether a stopping criterion has been met. A stopping criterion may be a target level of accuracy, a target number of processed audio samples from the training dataset, a target amount of change to parameters over one or more previous data points, a combination thereof, and/or other criteria. In some embodiments, the stopping criteria are met when at least a minimum number of data points have been processed, and at least a threshold accuracy is achieved. The threshold accuracy may be, for example, 70%, 80%, or 90% accuracy. In one embodiment, the stopping criteria are met if accuracy of the machine learning model has stopped improving. If the stopping criterion has not been met, further training is performed. If the stopping criterion has been met, training may be complete. Once the machine learning model is trained, a reserved portion of the training dataset may be used to test the model.

As an example, in one embodiment, a machine learning model (e.g., reference audio sample predictor 467) is trained to determine a reference audio sample to use in removing distortion from a target distorted audio sample. A similar process may be performed to train machine learning models to perform other tasks such as those set forth above. A set of many (e.g., thousands to millions) process results, such as PESQ scores, may be collected, and distortion removal configurations may be determined. Distortion removal configurations include selecting a reference audio sample from a library of samples. Distortion removal configurations may further include determining auto regression parameters and/or smoothing parameters. One or more machine learning models may further be utilized in selecting reference audio samples to be included in a library of reference audio samples for audio sample distortion removal operations, as described in connection with FIG. 5.

Once one or more trained machine learning models 438 are generated, they may be stored in model storage 445, and may be added to a plasma source configuration application. The plasma source configuration application may then use the one or more trained ML models 438 as well as additional processing logic to implement an automatic mode, in which user manual input of information is minimized or even eliminated in some instances.

For model application workflow 417, according to one embodiment, input data 462 may be input into reference audio sample predictor 467, which may include a trained neural network. Based on the input data 462, reference audio sample predictor 467 outputs information indicating a selection of a reference audio sample 469 for use in removing distortion effects from input data 462. The distortion removal operations may include linear prediction inverse modulation transfer function distortion removal operations, as described in connection with FIG. 1. In some embodiments, the machine learning model may be configured to provide further recommendations related to audio distortion removal, such as one or more parameters associated with various operations of a distortion removal procedure.

Figure 5:
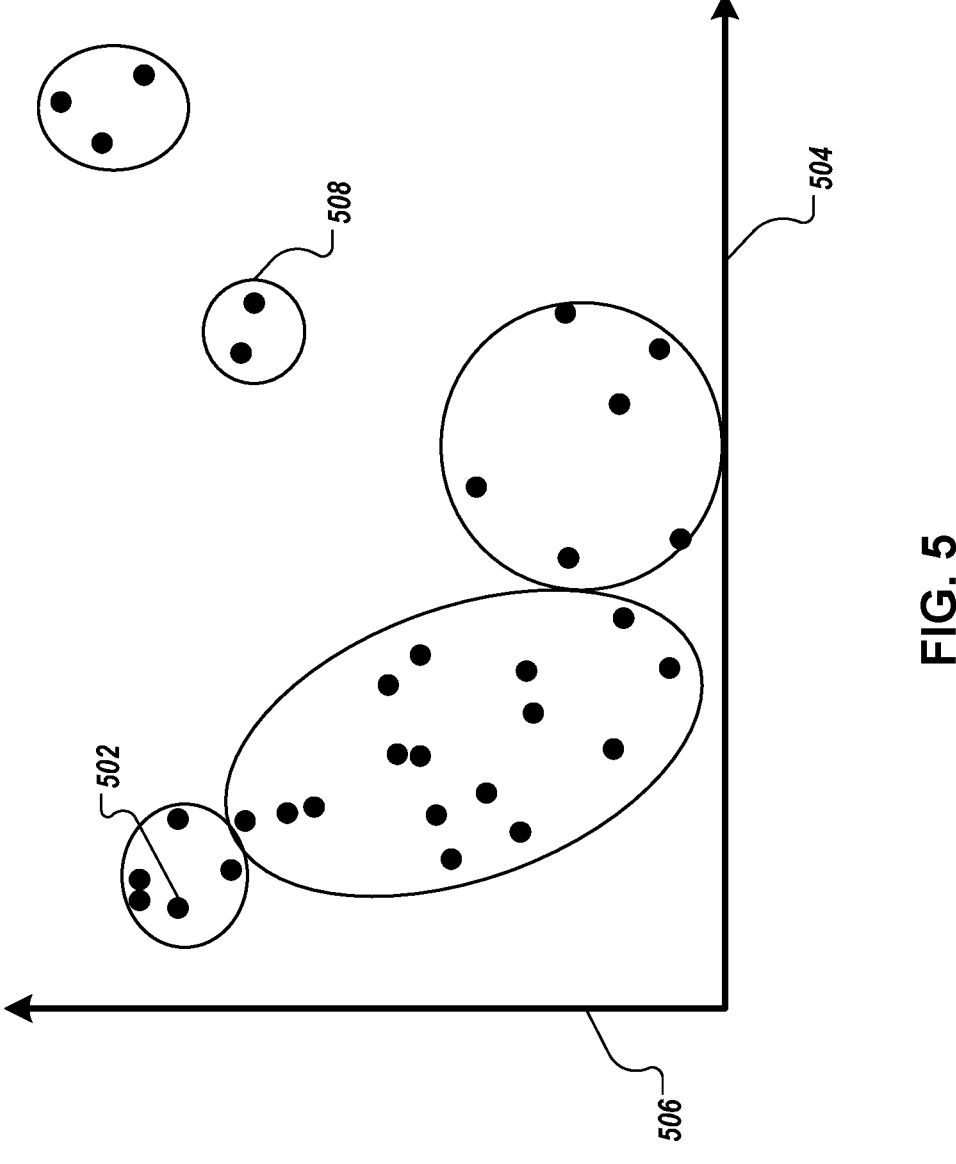
FIG. 5 is a depiction of a clustering diagram of reference audio samples based on performance for distortion removal operations, according to some embodiments.
Figure 5:

FIG. 5 is a depiction of clustering diagram 500 of reference audio samples based on performance for distortion removal operations, according to some embodiments. In some systems, a limited data storage may be available/allocated for audio distortion removal operations. A limited amount of data processing may be permitted for audio distortion removal operations. For example, a target portion of a memory device may be allocated for audio distortion removal operations. As a further example, a target processing time may limit operations of audio distortion removal.

In some embodiments, a large number of reference audio samples (e.g., reference voice recordings) may be available for distortion removal operations. A large number of reference audio samples may be available for training of one or more machine learning models. Data associated with the reference audio samples (e.g., filtering settings, analysis coefficients, etc.) may exceed a target data storage amount. Selecting a reference audio sample from the complete library of available reference audio samples may exceed target computational complexity for audio distortion removal operations.

A subset of available reference audio samples may be utilized for distortion removal operations. The size of the subset may be chosen to meet target memory consumption thresholds, target performance thresholds, target computational expense thresholds, or the like. In some embodiments, reference audio samples of the subset may be selected based on performance. For example, a target number of reference audio samples that show the best performance in distortion removal operations for a training set of distorted audio samples may be utilized.

In some embodiments, the subset of reference audio samples may be determined based on generating a diverse set of reference audio samples. In some embodiments, reference audio samples may be clustered according to distortion removal performance. Clustering diagram 500 depicts performance of each reference audio sample 502 on a first performance axis 504 and a second performance axis 506. The first and/or second performance axes may be related to a score indicating the effectiveness of utilizing the reference audio samples 502. The first and/or second performance axes may be based on PESQ scores. Each axis may be related to a PESQ score of removing distortion from a particular audio sample. In a general case, clustering diagram 500 may be a projection of a highly multi-dimensional distortion removal performance space. Clustering may be performed in performance space of the reference audio samples 502. Clustering may generate one or more clusters 508 that group reference audio samples 502 by performance. Clustering may be performed by providing input data indicative of performance of a set of reference audio samples 502 to a trained machine learning model. Clustering may be performed by providing input data to an unsupervised machine learning model. Clustering may be adjusted to generate a target number of clusters or approximately a target number of clusters. Clustering may be adjusted to generate a number of clusters related to a target number of members of the subset of reference audio samples to be utilized in audio distortion removal procedures. Clusters may be related to one or more characteristics of the reference audio samples, one or more characteristics of effectively cleaned distorted audio samples, etc. A target number of reference audio samples may be included in the subset of audio samples from each cluster. A trained machine learning model may select a reference audio sample for distortion removal operations from the subset of reference audio samples. One or more clusters of reference audio samples (e.g., which show overall poor performance) may not be included in the subset of reference audio samples. Different clusters may contribute different numbers of reference samples to the subset of reference audio samples. Determining a number of audio samples from a cluster to be included in the subset of reference audio samples may be based on one or more criteria. Determining a number of audio samples of a cluster to be included in the subset of reference audio samples may be based on the extent of the cluster in performance space, the number of reference audio samples in the cluster, the number of test audio samples associated with reference audio samples in the cluster, etc.

Figure 6C:
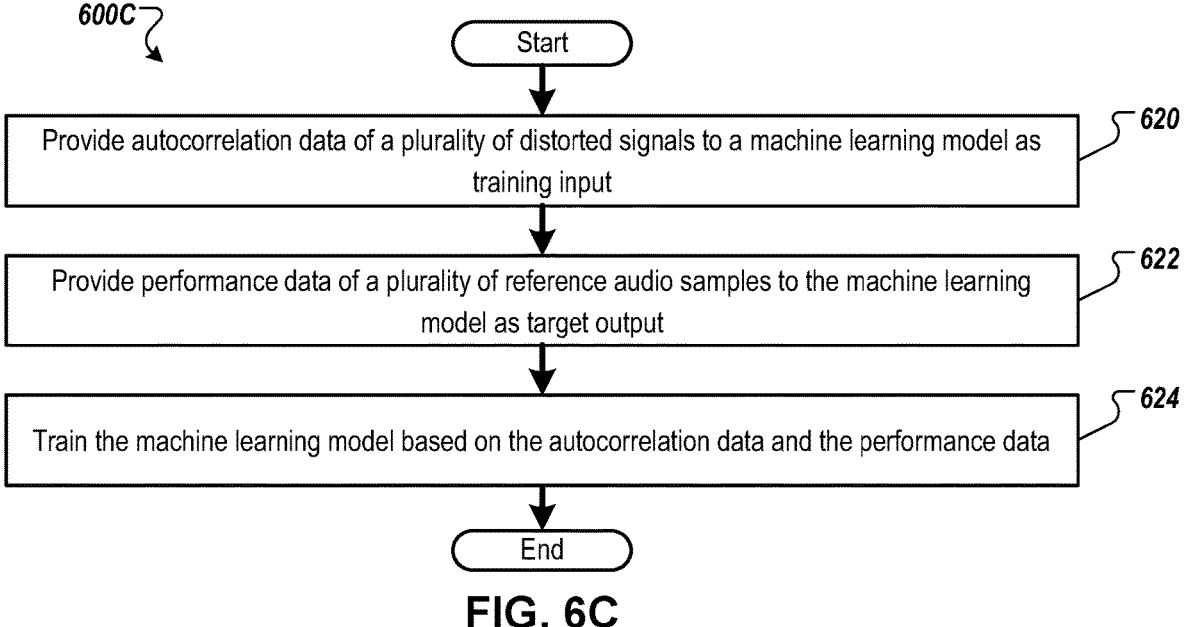
FIG. 6C is a flow diagram of a method for generating a trained machine learning model, according to some embodiments.

FIGS. 6A-C are flow diagrams of methods 600A-C associated with performing audio distortion correction techniques, according to some embodiments. Methods 600A-C may include or involve operations associated with machine learning models. Operations of method 600A may be associated with training a machine learning model. Operations of methods 600B-C may include use of one or more machine learning models. Methods 600A-C may be performed by processing logic that may include hardware (e.g., circuitry, dedicated logic, programmable logic, microcode, processing device, etc.), software (such as instructions run on a processing device, a general-purpose computer system, or a dedicated machine), firmware, microcode, or a combination thereof. A processing system such as a computer may use method 600A to generate a data set to at least one of train, validate, or test a machine learning model, in accordance with embodiments of the disclosure. In some embodiments, a non-transitory machine-readable storage medium stores instructions that when executed by a processor (or processing device) cause the processing device to perform one or more of methods 600A-C.

For simplicity of explanation, methods 600A-C are depicted and described as a series of operations. However, operations in accordance with this disclosure can occur in various orders and/or concurrently and with other operations not presented and described herein. Furthermore, not all illustrated operations may be performed to implement methods 600A-C in accordance with the disclosed subject matter. In addition, those skilled in the art will understand and appreciate that methods 600A-C could alternatively be represented as a series of interrelated states via a state diagram or events.

FIG. 6A is a flow diagram of a method 600A for generating a data set for a machine learning model, according to some embodiments. Referring to FIG. 6A, in some embodiments, at block 601 the processing logic implementing method 600A initializes a training set T to an empty set.

At block 602, processing logic generates first data input that may include one or more of audio sample data, distortion removal performance data, etc. The first data input may be or include first training input. The first data input may be or include first validating input. The first data input may be or include first testing input. In some embodiments, the first data input may include a first set of features for types of data, and a second data input may include a second set of features for types of data. For example, a first combination of characteristics of an audio sample may be included in first data, and a second combination of characteristics of an audio sample may be included in second data.

In some embodiments, at block 603, processing logic optionally generates a first target output for one or more of the data inputs (e.g., first data input). In some embodiments, the input includes one or more characteristics of audio samples, and the target output includes distortion removal performance data. In some embodiments, no target output is generated. No target output may not be generated in the case of an unsupervised machine learning model capable of grouping or finding correlations in input data, rather than requiring target output to be provided.

At block 604, processing logic optionally generates mapping data that is indicative of an input/output mapping. The input/output mapping (or mapping data) may refer to the data input (e.g., one or more of the data inputs described herein), the target output for the data input, and an association between the data input(s), and the target output. In some embodiments, such as in association with machine learning models where no target output is provided, block 604 may not be executed.

At block 605, processing logic adds the mapping data generated at block 604 to data set T, in some embodiments.

At block 606, processing logic branches based on whether data set T is sufficient for at least one of training, validating, and/or testing a machine learning model. If data set T is sufficient, execution proceeds to block 607, otherwise, execution continues back to block 602. It should be noted that in some embodiments, the sufficiency of data set T may be determined based simply on the number of inputs, mapped in some embodiments to outputs, in the data set. In some other embodiments, the sufficiency of data set T may be determined based on one or more other criteria (e.g., a measure of diversity of the data examples, accuracy, etc.) in addition to, or instead of, the number of inputs.

At block 607, processing logic provides data set T to train, validate, and/or test a machine learning model. In some embodiments, data set T is a training set and is provided to a training engine to perform the training. In some embodiments, data set T is a validation set and is provided to a validation engine to perform the validation. In some embodiments, data set T is a testing set and is provided to a testing engine to perform the testing. In the case of a neural network, for example, input values of a given input/output mapping are input to the neural network, and output values of the input/output mapping are stored in the output nodes of the neural network. The connection weights in the neural network are then adjusted in accordance with a learning algorithm (e.g., back propagation, etc.), and the procedure is repeated for the other input/output mappings in data set T. After block 607, a model can be at least one of trained using a training engine, validated using a validating engine, or tested using a testing engine.

FIG. 6B is a flow diagram of a method 600B for removing distortion from an audio sample, according to some embodiments. At block 610, processing logic receives an audio sample of a distorted voice. The audio sample may be generated via a microphone. The audio sample may be distorted by reverberations. The audio sample may be distorted by effects related to an environment where a voice was recorded to generate the audio sample. The audio sample may be a digital representation of a voice. The audio sample may be in the frequency domain. The audio sample may include output of a Fourier transform.

At block 612, processing logic extracts a first set of characteristics of the audio sample. Extracting the first set of characteristics may include performing a domain transfer of the audio sample. Extracting the first set of characteristics may include performing a Fourier transform of the audio sample, such as a short time Fourier transform. Extracting the first set of characteristics may include performing auto-correlation operations to extract autocorrelation characteristics. Extracting the first set of characteristics may include performing auto regression analysis to extract auto regression characteristics. Extracting the first set of characteristics may include performing smoothing. Extracting the first set of characteristics may include performing smoothing channel by channel of the audio sample. Extracting the first set of characteristics may include providing data based on the audio sample to a trained machine learning model. The trained machine learning model may determine one or more parameters of characteristic extraction, such as auto regression parameters, smoothing parameters, etc.

At block 614, processing logic selects a second set of characteristics. The second set of characteristics is associated with one of a first plurality of reference audio samples. The second set of characteristics may be selected from a library of sets of characteristics. The second set of characteristics may be filtering characteristics associated with a reference voice audio sample. The second set of characteristics may be selected by a trained machine learning model. The second set of characteristics may be selected from a library of sets of characteristics by the trained machine learning model. The second set of characteristics may be characteristics for performing linear prediction inverse modulation transfer function distortion removal operations. The first set of characteristics may be provided to the trained machine learning model. The trained machine learning model may generate as output a recommendation of the second set of characteristics based on the first set of characteristics. Selection of the second set of characteristics may be based on predicted performance of performing distortion removal techniques on the audio sample. Selection of the second set of characteristics may be based on predicted performance of generating an undistorted audio sample based on the audio sample. Generation of the undistorted sample may include calculations based on the first set of characteristics and the second set of characteristics.

Generating the trained machine learning model may include training, validation, model selection, and testing phases. Generation of the trained machine learning model may include providing a first plurality of indications of sets of characteristics associated with reference audio samples to a machine learning model as training input. The indications of sets of characteristics may be identifiers of a reference audio sample associated with each set of characteristics. Generation of the trained machine learning model may include providing characteristics of a first plurality of distorted audio samples to the machine learning model as training input. Generation of the trained machine learning model may include generating a plurality of undistorted audio samples. Each of the plurality of undistorted audio samples may be associated with one of the first plurality of distorted audio samples. Each of the plurality of undistorted audio samples may further be associated with one or the reference audio samples. Each of the plurality of undistorted audio samples may have been generated by performing MTF distortion removal operations on one of the distorted audio samples, utilizing one of the reference audio samples in the MTF operations. Generating the trained machine learning model may include determining a plurality of figures of merit. Each figure of merit may describe the quality of a distortion removal operation. Each figure of merit may describe the quality of a reference audio sample in removing distortion from a distorted audio sample. The figures of merit may be generated by comparing an undistorted sample to a distorted counterpart. The figures of merit may be or include PESQ scores. Generating the trained machine learning model may include training the machine learning model based on the first plurality of indications of sets of characteristics associated with the reference audio samples, the first plurality of characteristics of distorted audio samples, and the plurality of figures of merit.

In some embodiments, the first plurality of reference audio samples may be generated. The first plurality of reference audio samples may be a subset of available reference audio samples. Generating the first plurality of reference audio samples may include receiving a second plurality of reference audio samples. The first plurality of audio samples is a subset of the second plurality of reference audio samples. Generating the first plurality of reference audio samples may include generating indications of performance of reference audio samples of the second plurality of reference audio samples in operations of generating undistorted audio samples based on audio samples of distorted voices. Generating the first plurality of reference audio samples may further include performing clustering operations of reference audio samples of the second plurality of reference audio samples based on their performance at distortion removal. Generating the first plurality of reference audio samples may further include selecting reference audio samples comprising the first plurality of reference audio samples based on the clustering results. The clustering may be performing by a trained machine learning model, e.g., an unsupervised machine learning model.

In some embodiments, the audio sample may be a frame of a plurality of frames of a complete audio sample. Selecting the second set of characteristics may be further based on selection of sets of characteristics associated with one or more other frames that are associated with the audio sample, e.g., other frames from the complete audio sample. Selecting a reference audio sample for use in distortion removal of a frame of a complete audio sample may be based on selection of reference audio samples used in distortion removal operations of one or more other frames of the complete audio sample.

At block 616, processing logic generates an undistorted audio sample based on the audio sample, the first set of characteristics, and the second set of characteristics. Generating the undistorted audio sample may include performing MTF distortion removal operations. Generating the undistorted audio sample may include performing MTF dereverberation operations. Generating the undistorted audio sample may include performing linear prediction inverse modulation transfer function distortion removal operations. In some embodiments, the undistorted audio may be further provided to a processing device, e.g., for further processing. The undistorted audio may be provided to a speech recognition module. The undistorted audio may be provided to a speech parsing module. The undistorted audio may be provided to a wake-word-detection module for performing wake-word-detection operations. The undistorted audio may be provided to an automatic speech recognition module for performing automated speech recognition operations. Output of the speech recognition module may be provided to the processing logic.

FIG. 6C is a flow diagram of a method 600C for generating a trained machine learning model, according to some embodiments. At block 620, autocorrelation data is provided to a machine learning model as training input. The autocorrelation data is associated with a plurality of distorted signals. The autocorrelation data may be resultant data of performing autocorrelation procedures on distorted audio signals. The autocorrelation data may be autocorrelation matrices of distorted signals.

At block 622, processing logic provides performance data of a plurality of reference audio samples to the machine learning model as target output. The performance data may include indications of performance of the reference audio samples in distortion removal operations. The performance data may include indications of performance of the reference audio samples in removing distortion from the distorted audio signals of the autocorrelation data. The performance data may include an indexing indicating performance of a plurality of reference audio samples for removing distortion from each of the plurality of distorted signals. Performance data such as this may be provided if the machine learning model is to predict performance of one or more reference audio samples in distortion removal operations for a target distorted audio sample. The performance data may include an indication of which reference audio sample had the best performance in distortion removal operations for each of the distorted signals. Performance data such as this may be provided if the machine learning model is to predict a reference audio sample from a plurality of reference audio samples that will have the best performance in distortion removal operations for a target distorted audio sample.

Generating performance data may include utilizing a set of reference audio samples in distortion removal operations. Generating performance data may include generating scores indicating performance of reference audio samples in removing distortion from distorted audio samples. Generating performance data may include generating one or more figures of merit indicative of quality of performance of distortion removal operations. Generating performance data may include generating PESQ scores.

A set of reference audio samples may be generated for use in distortion removal operations. The set of reference audio samples may be used for generation of the machine learning models. The set of reference audio samples may be a subset of available reference audio samples. Reference audio samples of the set of reference audio samples may be selected based on their performance at distortion removal operations. Reference audio samples may be selected that have high performance in removing distortion from a set of distorted audio samples. Reference audio samples may be selected that effectively remove distortion from distorted audio samples exhibiting a variety of characteristics. Reference audio samples may be selected based on clustering based on performance data, characteristic data, etc.

At block 624, processing logic trains the machine learning model based on the autocorrelation data and the performance data. The machine learning model may be trained, validated, tested, etc., based on the autocorrelation data and the performance data.

Figure 7:
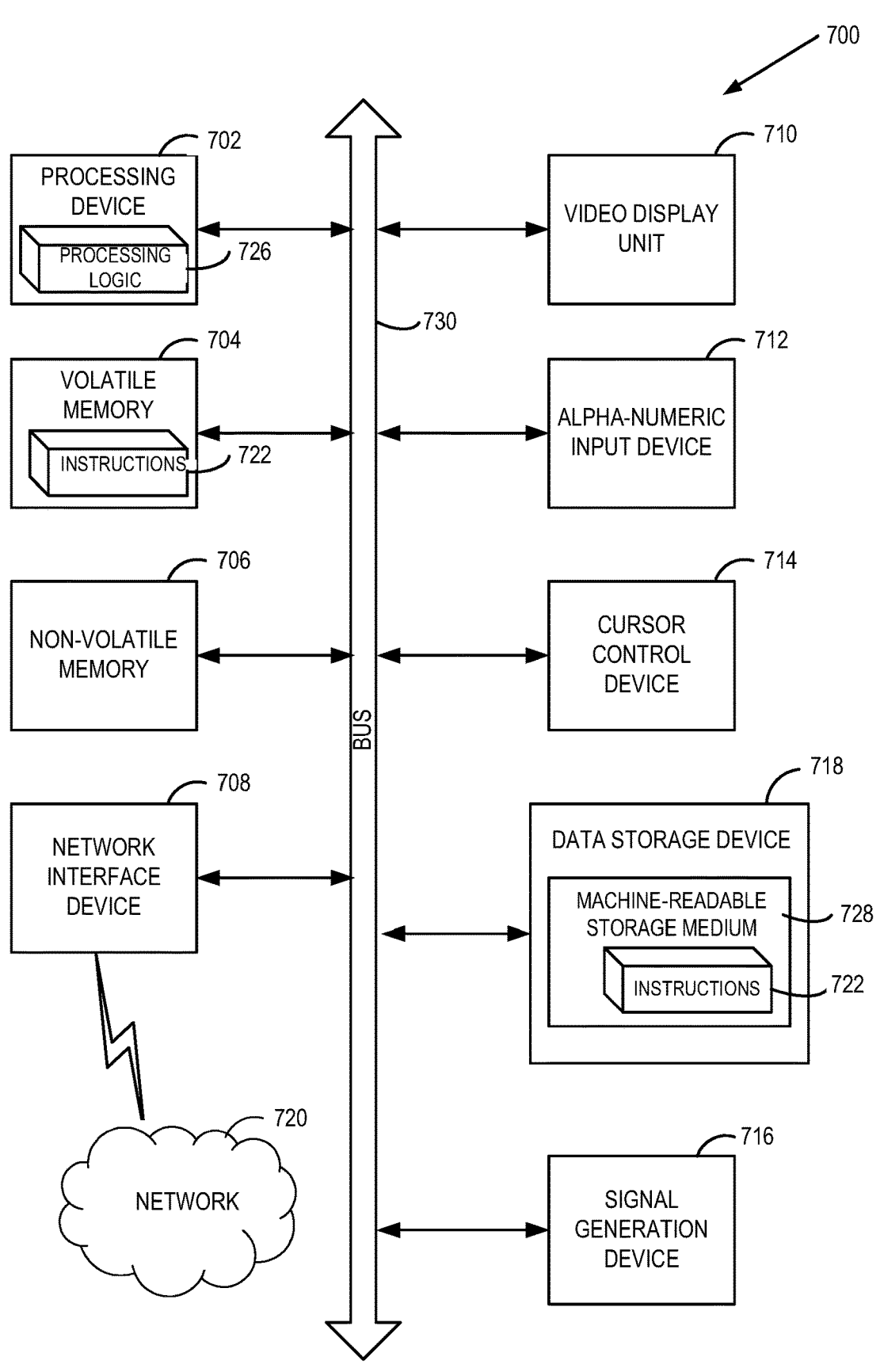
FIG. 7 depicts a block diagram of an example computing device capable of selecting a reference audio sample and performing distortion removal procedures, operating in accordance with one or more aspects of the disclosure.

FIG. 7 depicts a block diagram of an example computing device 700 capable of audio distortion removal operations, operating in accordance with one or more aspects of the disclosure. In various illustrative examples, various components of the computing device 700 may represent various components of computing device, a training engine, validation engine, and/or a testing engine for generating a machine learning model. In some embodiments, components of computing device 700 may perform operations of audio distortion removal, such as inference of a trained machine learning model, MTF distortion removal procedures, reference audio sample clustering, etc.

Example computing device 700 may be connected to other computer devices in a LAN, an intranet, an extranet, and/or the Internet. Computing device 700 may operate in the capacity of a server in a client-server network environment. Computing device 700 may be a personal computer (PC), a set-top box (STB), a server, a network router, a switch or a bridge, or any device capable of executing a set of instructions (sequential or otherwise) that specify actions to be taken by that device. Further, while only a single example computing device is illustrated, the term "computer" shall also be taken to include any collection of computers that individually or jointly execute a set (or multiple sets) of instructions to perform any one or more of the methods discussed herein.

Example computing device 700 may include a processing device 702 (also referred to as a processor or CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which may communicate with each other via a bus 730.

Processing device 702 represents one or more general-purpose processing devices such as a microprocessor, central processing unit, or the like. More particularly, processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application-specific integrated circuit (ASIC), a field programmable gate array (FPGA), a digital signal processor (DSP), a network processor, or the like. In accordance with one or more aspects of the disclosure, processing device 702 may be configured to execute instructions implementing methods 600A-C discussed in connection with FIGS. 6A-C.

Example computing device 700 may further comprise a network interface device 708, which may be communicatively coupled to a network 720. Example computing device 700 may further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 716 (e.g., a speaker). Computing device 700 may further comprise an input audio device, such as a digital or analog microphone.

Data storage device 718 may include a machine-readable storage medium (or, more specifically, a non-transitory machine-readable storage medium) 728 on which is stored one or more sets of executable instructions 722. In accordance with one or more aspects of the disclosure, executable instructions 722 may comprise executable instructions associated with executing methods 600A-C discussed in connection with FIGS. 6A-C.

Executable instructions 722 may also reside, completely or at least partially, within main memory 704 and/or within processing device 702 during execution thereof by example computing device 700, main memory 704, and processing device 702 also constituting computer-readable storage media. Executable instructions 722 may further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the disclosure also relate to an apparatus for performing the methods described herein. This apparatus may be specially constructed for the required purposes, or it may be a general-purpose computer system selectively programmed by a computer program stored in the computer system. Such a computer program may be stored in a computer-readable storage medium, such as, but not limited to, any type of disk including optical disks, compact disc read-only memory (CD-ROMs), and magnetic-optical disks, read-only memories (ROMs), random access memories (RAMs), erasable programmable read-only memory (EPROMs), electrically erasable programmable read-only memory (EEPROMs), magnetic disk storage media, optical storage media, flash memory devices, other types of machine-accessible storage media, or any type of media suitable for storing electronic instructions, each coupled to a computer system bus.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear as set forth in the description below. In addition, the scope of the disclosure is not limited to any particular programming language. It will be appreciated that a variety of programming languages may be used to implement the teachings of the disclosure.

The preceding description sets forth numerous specific details such as examples of specific systems, components, methods, and so forth, in order to provide a good understanding of several embodiments of the disclosure. It will be apparent to one skilled in the art, however, that at least some embodiments of the disclosure may be practiced without these specific details. In other instances, well-known components or methods are not described in detail or are presented in simple block diagram format in order to avoid unnecessarily obscuring the disclosure. Thus, the specific details set forth are merely exemplary. Particular implementations may vary from these exemplary details and still be contemplated to be within the scope of the disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
    receiving, by a processing device, an audio sample of a distorted voice;
    extracting a first set of audio sample characteristics, comprising a first set of vocal attributes and a first set of non-vocal attributes of the audio sample;
    selecting a reference audio sample from a first plurality of reference audio samples based on a similarity between the first set of vocal attributes and a second set of vocal attributes of the reference audio sample;
    determining a second set of non-vocal attributes of the reference audio sample; and
    generating an undistorted audio sample based on the audio sample, the first set of non-vocal attributes, and the second set of non-vocal attributes by utilizing the first set of non-vocal attributes and the second set of non-vocal attributes to reduce a distortion effect of the audio sample.

2. The method of claim 1, wherein selecting the reference audio sample comprises:

providing the first set of vocal attributes to a trained machine learning model; and receiving, from the trained machine learning model, a selection of the reference audio sample with the second set of vocal attributes, wherein the trained machine learning model is configured to select the reference audio sample from the first plurality of reference audio samples based on predicted performance of the generating of the undistorted audio sample based on the first set of vocal attributes and the second set of vocal attributes.

3. The method of claim 2, wherein the first set of audio sample characteristics comprises a plurality of auto regression coefficients associated with the audio sample, and wherein the trained machine learning model is further to generate a set of parameters for use in generating the plurality of auto regression coefficients, wherein the set of parameters is based on the audio sample.

4. The method of claim 2, wherein extracting the first set of audio sample characteristics comprises data smoothing, and wherein smoothing parameters are provided by the trained machine learning model.

5. The method of claim 2, wherein generating the trained machine learning model comprises:

providing a first plurality of indications of sets of characteristics associated with reference audio samples to a machine learning model as training input;

providing a first plurality of characteristics of distorted audio samples to the machine learning model as training input;

generating a plurality of undistorted audio samples, wherein each of the plurality of undistorted audio samples is based on one of the first plurality of indications of sets of characteristics associated with reference audio samples and one of the first plurality of characteristics of distorted audio samples;

determining of plurality of figures of merit indicative of a quality of the plurality of undistorted audio samples;

providing the plurality of figures of merit to the machine learning model; and training the machine learning model based on the first plurality of indications of sets of characteristics associated with reference audio samples, the first plurality of characteristics of distorted audio samples, and the plurality of figures of merit.

6. The method of claim 5, wherein the generating a figure of merit of the plurality of figures of merit comprises comparing an undistorted audio sample to a corresponding distorted audio sample.

7. The method of claim 5, wherein generating the plurality of figures of merit comprises perceptual evaluation of speech quality (PESQ) operations.

8. The method of claim 1, wherein generating the undistorted audio sample comprises performing modulation transfer function dereverberation operations.

9. The method of claim 1, wherein generating the first plurality of reference audio samples comprises:

receiving a second plurality of reference audio samples, wherein the first plurality of reference audio samples is a subset of the second plurality of reference audio samples;

generating indications of performance of reference audio samples of the second plurality of reference audio samples in operations of generating undistorted audio samples based on audio samples of distorted voices;

clustering reference audio samples of the second plurality of reference audio samples based on their performance; and selecting reference audio samples comprising the first plurality of reference audio samples based on the clustering.

10. The method of claim 1, wherein the audio sample comprises a frame of a plurality of frames, and wherein selecting the reference audio sample is based on selections of sets of characteristics associated with other frames also associated with the distorted voice.

11. The method of claim 1, further comprising providing the undistorted audio sample to a speech recognition module configured to perform wake-word-detection operations or automated speech recognition operations; and obtaining output from the speech recognition module.

12. A system, comprising memory and a processing device coupled to the memory, wherein the processing device is configured to:

receive an audio sample of a distorted voice;

extract a first set of audio sample characteristics, comprising a first set of vocal attributes and a first set of non-vocal attributes of the audio sample;

select a reference audio sample from a first plurality of reference audio samples based on a similarity between the first set of vocal attributes and a second set of vocal attributes of the reference audio sample;

determine a second set of non-vocal attributes of the reference audio sample; and generate an undistorted audio sample based on the audio sample, the first set of non-vocal attributes, and the second set of non-vocal attributes by utilizing the first set of non-vocal attributes and the second set of non-vocal attributes to reduce a distortion effect of the audio sample.

13. The system of claim 12, wherein selecting the reference audio sample comprises:

providing the first set of vocal attributes to a trained machine learning model; and receiving, from the trained machine learning model, a selection of the reference audio sample with the second set of vocal attributes, wherein the trained machine learning model is configured to select the reference audio sample from the first plurality of reference audio samples based on predicted performance of the generating of the undistorted audio sample based on the first set of vocal attributes and the second set of vocal attributes.

14. The system of claim 13, wherein generating the trained machine learning model comprises:

providing a first plurality of indications of sets of characteristics associated with reference audio samples to a machine learning model as training input;

providing a first plurality of characteristics of distorted audio samples to the machine learning model as training input;

generating a plurality of undistorted audio samples, wherein each of the plurality of undistorted audio samples is based on one of the first plurality of indications of sets of characteristics associated with reference audio samples and one of the first plurality of characteristics of distorted audio samples;

determining of plurality of figures of merit indicative of a quality of the plurality of undistorted audio samples;

providing the plurality of figures of merit to the machine learning model; and training the machine learning model based on the first plurality of indications of sets of characteristics associated with reference audio samples, the first plurality of characteristics of distorted audio samples, and the plurality of figures of merit.

15. The system of claim 12, wherein the first plurality of reference audio samples comprises a subset of a library of reference audio samples, and wherein generating the subset comprises:

generating indications of performance of reference audio samples of the library of reference audio samples, wherein the indications of performance are based on a quality of undistorted audio samples generated based on audio samples of distorted voices;

clustering reference audio samples of the library of reference audio samples based on the indications of performance; and selecting reference audio samples of the first plurality of reference audio samples based on the clustering.

16. The system of claim 12, wherein the processing device is further configured to:

provide the undistorted audio sample to a speech recognition module configured to perform wake-word-detection operations or automated speech recognition operations; and obtain output from the speech recognition module based on the undistorted audio sample.

17. A non-transitory machine-readable storage medium storing instruction which, when executed, cause a processing device to perform operations comprising:

receiving an audio sample of a distorted voice;

extracting a first set of audio sample characteristics, comprising a first set of vocal attributes and a first set of non-vocal attributes of the audio sample;

selecting a reference audio sample from a first plurality of reference audio samples based on a similarity between the first set of vocal attributes and a second set of vocal attributes of the reference audio sample;

determining a second set of non-vocal attributes of the reference audio sample; and generating an undistorted audio sample based on the audio sample, the first set of non-vocal attributes, and the second set of non-vocal attributes by utilizing the first set of non-vocal attributes and the second set of non-vocal attributes to reduce a distortion effect of the audio sample.

18. The non-transitory machine-readable storage medium of claim 17, wherein selecting the reference audio sample comprises:

providing the first set of vocal attributes to a trained machine learning model; and receiving, from the trained machine learning model, a selection of the reference audio sample with the second set of vocal attributes, wherein the trained machine learning model is configured to select the reference audio sample from the first plurality of reference audio samples based on predicted performance of the generating of the undistorted audio sample based on the first set of vocal attributes and the second set of vocal attributes.

19. The non-transitory machine-readable storage medium of claim 18, wherein generating the trained machine learning model comprises:

providing a first plurality of indications of sets of characteristics associated with reference audio samples to a machine learning model as training input;

providing a first plurality of characteristics of distorted audio samples to the machine learning model as training input;

generating a plurality of undistorted audio samples, wherein each of the plurality of undistorted audio samples is based on one of the first plurality of indications of sets of characteristics associated with reference audio samples and one of the first plurality of characteristics of distorted audio samples;

determining of plurality of figures of merit indicative of a quality of the plurality of undistorted audio samples;

providing the plurality of figures of merit to the machine learning model; and training the machine learning model based on the first plurality of indications of sets of characteristics associated with reference audio samples, the first plurality of characteristics of distorted audio samples, and the plurality of figures of merit.

20. The non-transitory machine-readable storage medium of claim 17, wherein the operations further comprise:

providing the undistorted audio sample to a speech recognition module configured to perform wake-word-detection operations or automated speech recognition operations; and obtaining output, based on the undistorted audio sample, from the speech recognition module.

* * * * *